March 10, 1970     R. E. W. MANLEY     3,499,438
RESPIRATORY METERING DEVICE
Filed May 19, 1966
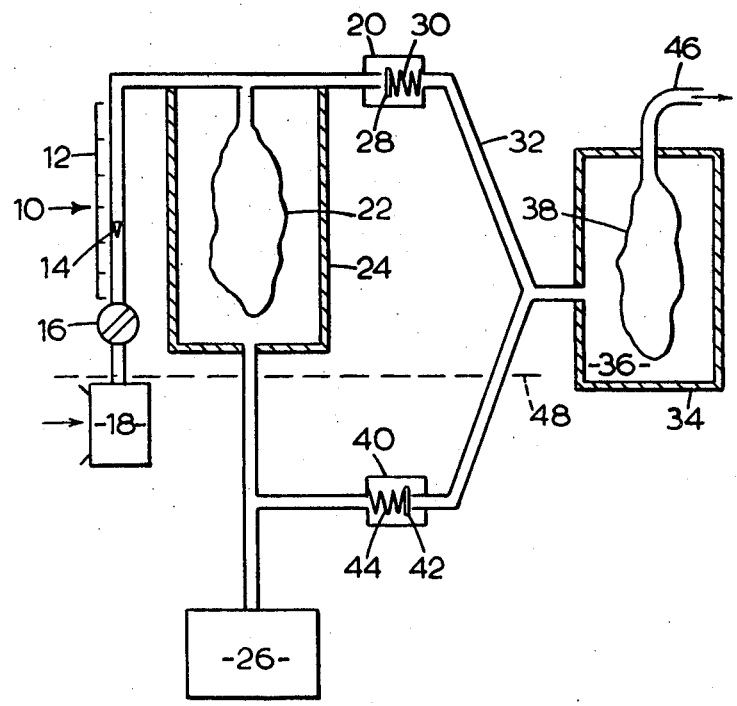
INVENTOR
ROGER E. W. MANLEY
By Shoemaker and Mattare
ATTYS.

United States Patent Office 3,499,438
Patented Mar. 10, 1970

3,499,438
RESPIRATORY METERING DEVICE
Roger E. W. Manley, Chorleywood, England, assignor to Blease Anaesthetic Equipment Limited, Chesham, England
Filed May 19, 1966, Ser. No. 551,286
Int. Cl. A62b 7/02; A61b 5/08
U.S. Cl. 128—145.6                                              3 Claims

ABSTRACT OF THE DISCLOSURE

A metering device particularly for supplying a predetermined small quantity of air or oxygen to the lungs of an infant for ventilation purposes employs a deformable bag which is squeezed to supply the air or oxygen. Such squeezing is done by supply of a predetermined volume of air or gas to the exterior of a further deformable bag located within a closed chamber. The volume of the contents of the latter bag so expelled is determined by the volume supplied, the latter being accurately determined by a constant flow rate supply of air or gas which is allowed to fill the said bag for a selected period of time.

---

This invention relates to a metering device for supplying a regulated tidal volume of air or gas to the lungs of a patient.

In this specification, the term "tidal volume" means the total volume breathed in by a patient during the inhalation phase of his breathing, irrespective of whether such breathing is natural, artificially assisted, or artificial.

Devices for metering tidal volume which have been previously proposed, while giving reasonable satisfactory performance so long as the tidal volume required by the patient is fairly larger, say 300–600 cc., have been wholly unsatisfactory when tidal volumes of only 5–10 cc. are required as is the case with very young babies. In fact, medical specialists have hitherto been of the opinion that mechanically assisted respiration for young babies is impractical, because of the deficiencies of existing equipment. The principal deficiency is that, when set to deliver a tidal volume of say 10 cc., the accuracy of known equipment is very low and the actual tidal volume delivered is in error by up to 500%. This is dangerous and unacceptable where young babies are concerned.

It is an aim of the present invention to provide a metering device capable of utilization with many known forms of ventilation equipment and which provides greater accuracy than prior art equipment.

According to the invention, a metering device for supplying a regulated tidal volume of air or gas to the lungs of a patient comprises: a flowmeter adapted for connection to a constant flow rate supply of air or gas, the flowmeter having its output connected to the inlet of a non-return valve and to the interior of a deformable bag; a chamber surrounding the bag and adapted for connection to a source of gas of cyclically fluctuating pressure having a predetermined frequency of fluctuation; and a substantially constant volume conduit system connecting the output of the non-return valve to a closed container of variable volume, fluctuations in such volume being able to force a corresponding volume of air or gas into the lungs of the patient; and a suction means connected via a second non-return valve to the container for effecting intermittent removal of a part of the air or gas therein.

In a preferred embodiment of the invention, the suction means employed is the suction phase of the source of gas having a cyclically fluctuating pressure, and this source may advantageously be a ventilating machine of any known kind. For example, the machine known in the art of the "Manley" respirator and described and claimed in our British Patent No. 971,953 could be used.

In an advantageous embodiment of the invention the closed container of variable volume is formed by a gas-tight box or the like within which is located a deformable breathing bag, and with this arrangement the delivery of a predetermined volume of gas into the box results in the same amount being expelled from the breathing bag to the patient. The amount so expelled is the accurately regulated tidal volume referred to above.

The manner of operation of the preferred form of metering device is as follows.

The flow rate from the supply can be selected, and the air or gas then passes either to the deformable bag or to the closed container according to whether the first non-return valve is shut or open. The deformable bag is subject to cyclical pressure fluctuations, and the bias holding the first non-return valve closed is arranged to be such that it is closed except when the pressure at its inlet is at a level equal to that generated by the positive cycles from the source of gas of cyclically fluctuating pressure. The first non-return valve thus opens once per positive half cycle. If the selected flow rate is say 300 cc. per minute, and the cyclical fluctuations have a frequency of say 60 cycles per minute, then the quantity passing through the first non-return valve is an accurately metered 300÷60=5 cc. per opening of the first non-return valve. Upon entering the closed container, this causes a 5 cc. contraction of the deformable breathing bag, and an accurately metered 5 cc. of gas or air, according to the contents of the deformable breathing bag, is expelled from the breathing bag to the patient. The negative half-cycle generated by the source opens the second non-return valve and removes some of the gas from the closed container, permitting the breathing bag to expand and draw in or be charged with gas or air.

The breathing bag can be arranged in any known ventilation circuit, and anesthetic or other gases admixed if desired with air can be used to charge the breathing bag.

An illustrative example of the present invention will now be described with reference to the accompanying diagrammatic drawing.

The illustrated device includes a flowmeter generally indicated at 10, having an indicator 14 whose position relative to a scale 12 shows the rate of flow, and this flowmeter 10 is connected, via a flow control valve 16, to a constant flow rate supply of air or gas in the form of, for example, a turbine pump 18.

In the example shown, the pump 18 draws in air from the surrounding atmosphere as indicated by the arrow, and supplies it to the flowmeter.

The output of the flowmeter is connected to a non-return valve 20 and to the interior of a deformable bag 22. The bag 22 is located within a chamber 24, and the latter is connected to a source of gas of cyclically fluctuating pressure having a predetermined frequency of fluctuation diagrammatically indicated at 26.

The non-return valve 20 has a valve member 28 urged by a spring 30 towards its closed position shown in the drawing.

A substantially constant volume conduit system 32 connects the output of the non-return valve 20 to a closed container 34, the interior volume 36 of this container being variable by virtue of the presence within the container of a deformable breathing bag 38.

Also connected to the container 34 is a suction means which in this embodiment of the invention takes the form of a connection to the source of gas 26 from a second non-return valve 40. This valve is normally closed and has a valve member 42 biassed by a spring 44.

The outlet 46 of the breathing bag 38 is connected to the face mask (not shown) for the patient, by means of any known ventilation circuit which may include if desired means for supplying anaesthetic for analgestic gases to the patient. Suitable forms of ventilation circuit will be well known to those skilled in the art, and are therefore not described.

The operation of the apparatus is follows.

The flow control valve 16 is adjusted so that the desired flow rate—say for example 300 cc. per minute—is indicated by the flowmeter 10. As the non-return valve 20 is closed initially, this flow passes into the deformable bag 22. The source of gas 26 of cyclically fluctuating pressure is then set into operation, and the positive pressure half cycle generates a corresponding positive pressure in chamber 24. This increases the pressure within bag 22 and therefore the pressure at the inlet (left hand) side of non-return valve 20 to a level at which the bias of spring 30 on the valve member 28 is overcome, and the valve 20 therefore opens for the duration of the positive half cycle. The gas passing through valve 20 enters constant volume conduit system 32 and closed container 34, but cannot escape through non-return valve 40 because this is biassed closed by spring 44. It therefore compresses breathing bag 38 by an amount corresponding to the volume of gas allowed to enter the system through non-return valve 20. Assuming that the cyclical pressure fluctuations from source 26 have a frequency of 60 cycles per minute, the flow rate shown by flowmeter 10 being 300 cc. per minute, it can be seen that the volume of gas passed through non-return valve 20 per positive half cycle is 5 cc. Entry of this 5 cc. of gas into the constant volume conduit system 32 and constant volume container 34 results in a forced contraction of breathing bag 38 by a corresponding amount, whereby an accurately metered 5 cc. tidal volume is expelled from bag 38 to the lungs of the patient.

The negative half cycle from the source 26 results in a reduction in pressure within the chamber 24 and at the left hand side of valve 40. Air or gas from pump 18 then passes into bag 22, and non-return valve 40 opens. There is a consequent reduction in pressure within closed container 34 and bag 38 is also caused to expand drawing in some air or gas as the case may be from the ventilation circuit connected to its outlet 46. The parts are then in condition for re-commencement of the cycle.

It will be seen that by adjustment of flow control valve 16 and by adjustment of the frequency of fluctuating source 26, and desired tidal volume and inhalation/exhalation frequency can be obtained within reasonable limits. It will also be noted that the gas or air supplied to the patient is entirely independent of, and isolated from, the gas supplied by either pump 18 or fluctuating pressure source 26.

One of the advantages of the present invention is that the metering device per se can be constructed in a compact manner and can be located very near to the patient's head. All the parts shown on the drawing below the dotted line 48 can be located remote from the patient, at any convenient position, connections to the remainder of the apparatus being made by flexible or other pipes. A disadvantage of prior apparatus is that the use of such flexible pipes introduces serious errors, and the volume contained in such pipes is not necessarily accurately reproducible. Moreover their compliance (i.e. the deformation produced as a function of pressure) is also not accurately reproducible, and these factors have been found to be fruitful sources of error. With the apparatus specifically described herein, the constant volume system 32 and container 34 have a total volume which is accurately known and which is not subject to uncontrollable fluctuation.

By way of practical example, satisfactory results have been achieved with an apparatus in which the bag 22 contains about 100 cc. when fully expanded, and in which the non-return valve 20 opens when the pressure at its inlet is ½ cm. of water. Satisfactory results have also been achieved when this pressure is up to 4 cm. of water.

It will be appreciated that modifications can be made within the scope of the invention. For example, any gas supply giving a substantially constant flow rate could be substituted for pump 18. It is convenient but not essential that the negative phase during which breathing bag 38 expands and is filled with air or gas as the case may be should be provided by the negative phase of the source of fluctuating pressure 26, but this is not essential and other suction devices could be used. Any known form of flowmeter could be used in substitution for the flowmeter illustrated at 10. Other known forms of non-return valve could be employed instead of the valves illustrated at 20 and 40.

It will be seen that in its broadest aspect, the invention consists in a device for supplying a regulated tidal volume of air or gas to the lungs of a patient in which the desired tidal volume is obtained as the quotient of a selected constant flow rate from a gas or air supply and a selected frequency of opening a valve in series with the supply.

I claim:
1. A metering device for supplying a regulated tidal volume of air or gas to the lungs of a patient comprising a flow meter having an inlet and outlet, a constant flow rate supply of air or gas connected to the said inlet, a non-return valve having an input and output with the former connected to the said outlet, a deformable bag directly connected to the said outlet and to said input, a chamber surrounding the bag, a source of gas of cyclically fluctuating pressure having a predetermined frequency of fluctuation connected to the chamber to effect in operation periodic opening of the said non-return valve to allow passage of a volume of air or gas determined by the said constant flow rate and the period during which the said valve is open, a closed container of variable volume externally bounded by rigid walls of a gas-tight box and internally bounded by a second deformable bag, a substantially constant volume conduit system connecting the said output and the said closed container, a suction means connected via a second non-return valve to the closed container for effecting intermittent removal of a part of the air or gas therein, and means associated with the said closed container connecting the interior of the second deformable bag to a face mask for a patient whereby in operation fluctuations in the volume of the said closed container force a corresponding volume of air or gas from the second deformable bag into the lungs of the patient.

2. A device according to claim 1 in which the suction means comprises a connection between the said source of gas and the second non-return valve.

3. A device according to claim 1 in which the first non-return valve is biased normally closed and in which a pressure of ½ to 4 cm. of water is required to overcome the bias and open the valve.

References Cited

UNITED STATES PATENTS

| | | | |
|---|---|---|---|
| 3,068,857 | 12/1962 | Black | 128—145.8 |
| 3,114,365 | 12/1963 | Franz | 128—145.8 |
| 3,167,070 | 1/1965 | Silverman | 128—145.6 |
| 3,256,876 | 6/1966 | Elam | 128—145.8 |
| 3,351,092 | 11/1967 | Ingerfield et al. | 128—145.8 XR |
| 3,352,304 | 11/1967 | Bartlett | 128—145.8 |

FOREIGN PATENTS

| | | |
|---|---|---|
| 1,487,768 | 5/1967 | France. |
| 847,280 | 9/1960 | Great Britain. |

OTHER REFERENCES

British Journal of Anaesthesia (1958), 30, 32 (pp. 32–36).

The Lancet, May 29, 1965, vol. I, 1965 (pp. 1145–1147).

ADELE M. EAGER, Primary Examiner

KYLE L. HOWELL, Assistant Examiner